United States Patent
Prasad et al.

(10) Patent No.: US 7,567,566 B2
(45) Date of Patent: Jul. 28, 2009

(54) METHOD AND APPARATUS TO PERFORM AGING

(75) Inventors: Kavitha A. Prasad, San Jose, CA (US); Miguel A. Guerrero, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 920 days.

(21) Appl. No.: 10/651,380

(22) Filed: Aug. 29, 2003

(65) Prior Publication Data

US 2005/0047408 A1   Mar. 3, 2005

(51) Int. Cl.
*H04L 12/56* (2006.01)
(52) U.S. Cl. .................................. 370/392; 370/401
(58) Field of Classification Search .............. 370/389, 370/392, 401–403
See application file for complete search history.

(56) References Cited

U.S. PATENT DOCUMENTS

| | | | | |
|---|---|---|---|---|
| 5,481,532 | A * | 1/1996 | Hassan et al. | 370/312 |
| 6,510,150 | B1 * | 1/2003 | Ngo | 370/347 |
| 6,529,507 | B1 * | 3/2003 | O'Malley et al. | 370/392 |
| 6,747,951 | B1 * | 6/2004 | Kalkunte et al. | 370/235 |
| 6,975,652 | B1 * | 12/2005 | Mannette et al. | 370/503 |
| 6,993,033 | B1 * | 1/2006 | Williams | 370/400 |
| 7,233,991 | B2 * | 6/2007 | Adhikari | 709/224 |

* cited by examiner

*Primary Examiner*—Wing F Chan
*Assistant Examiner*—Marcus R Smith
(74) *Attorney, Agent, or Firm*—Kacvinsky LLC

(57) ABSTRACT

A method and apparatus to perform aging are described. A method to perform timing comprises receiving an address and retrieving an age zone value associated with the received address. A time is then determined using the retrieved age zone value. The determined time may then be associated with the received address.

10 Claims, 6 Drawing Sheets

METHOD AND APPARATUS TO PERFORM AGING

BACKGROUND

A network node such as a bridge or switch may communicate information for other network nodes based on their network addresses. The network node may maintain a list of network addresses to assist in processing packets received from other network nodes. The network node may use "aging" techniques to examine the list and determine whether to remove one or more network addresses that have not been used for a certain period of time. This may ensure efficient use of memory resources as well as prevent incorrect forwarding of packets, for example. Consequently, improved aging techniques may improve performance of the network node. Accordingly, there may be need for improvements in such aging techniques in a device or network.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
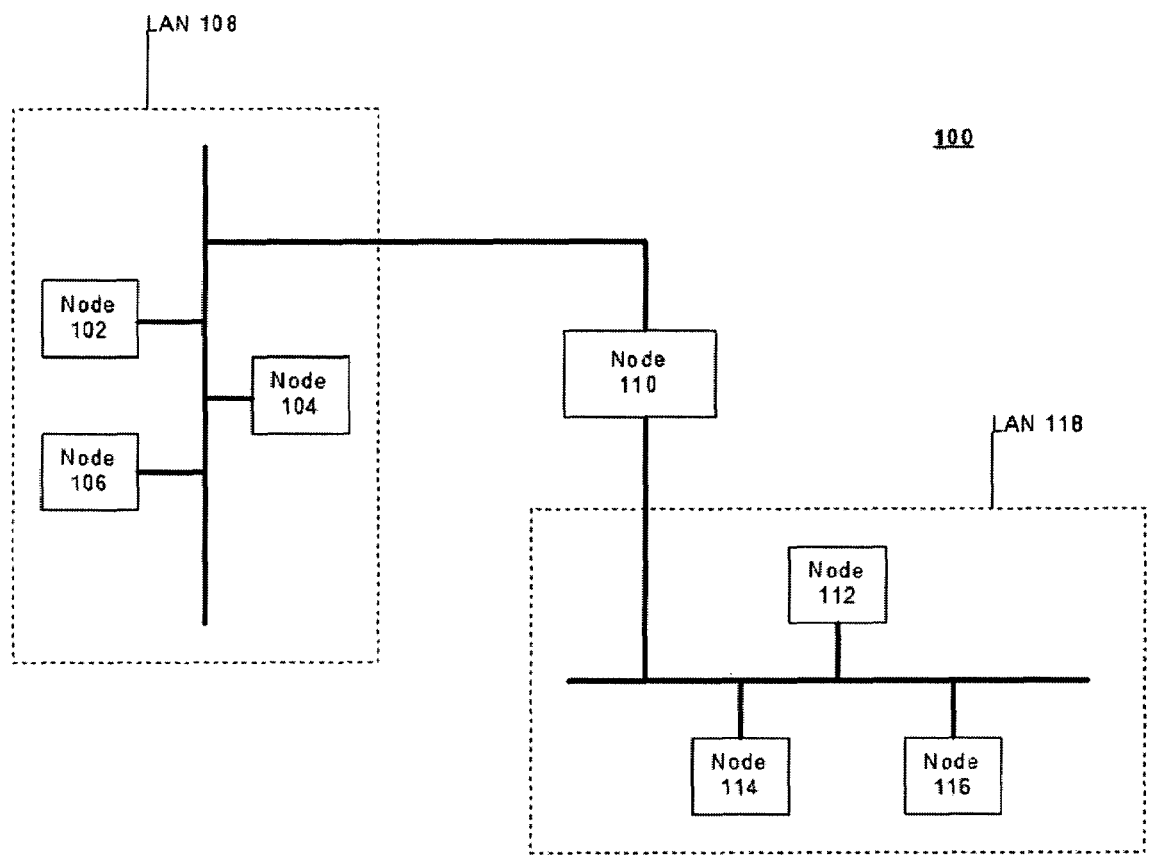
FIG. 1 illustrates a system suitable for practicing one embodiment.

Referring now in detail to the drawings wherein like parts are designated by like reference numerals throughout, there is illustrated in FIG. 1 a system suitable for practicing one embodiment. FIG. 1 is a block diagram of a system 100. System 100 may comprise a plurality of network nodes. The term "network node" as used herein may refer to any node capable of communicating information in accordance with one or more protocols. Examples of network nodes may include a computer, server, switch, router, bridge, gateway, personal digital assistant, mobile device, call terminal and so forth. The term "protocol" as used herein may refer to a set of instructions to control how the information is communicated over the communications medium.

In one embodiment, system 100 may communicate various types of information between the various network nodes. For example, one type of information may comprise "media information." Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Another type of information may comprise "control information." Control information may refer to any data representing commands, instructions or control words meant for an automated system. For example, control information may be used to route media information through a network, or instruct a network node to process the media information in a predetermined manner.

In one embodiment, one or more communications mediums may connect the nodes. The term "communications medium" as used herein may refer to any medium capable of carrying information signals. Examples of communications mediums may include metal leads, semiconductor material, twisted-pair wire, co-axial cable, fiber optic, radio frequencies (RF) and so forth. The terms "connection" or "interconnection," and variations thereof, in this context may refer to physical connections and/or logical connections.

In one embodiment, the network nodes may communicate information to each other in the form of packets. A packet in this context may refer to a set of information of a limited length, with the length typically represented in terms of bits or bytes. An example of a packet length might be 1000 bytes.

In one embodiment, the packets may be communicated in accordance with one or more packet protocols. For example, in one embodiment the packet protocols may include protocols typically used for a Local Area Network (LAN), such as the Ethernet protocol or Token Ring protocol. The packet protocols may also include protocols typically used for a Wide Area Network (WAN), such as the Transmission Control Protocol (TCP) and Internet Protocol (IP). The embodiments are not limited in this context.

Referring again to FIG. 1, system 100 may comprise a LAN 108 and a LAN 118 connected by a network node 110. LAN 108 may comprise network nodes 102, 104 and 106 connected by one or more communications medium. LAN 118 may comprise network nodes 112, 114 and 116, also connected by one or more communications mediums. In one embodiment, for example, the network nodes may be computers, for example. The network nodes may communicate with each other using any number of communication protocols, such as the Ethernet or Token Ring protocols. Although FIG. 1 shows a limited number of network nodes, it can be appreciated that any number of network nodes may be used in system 100.

System 100 may also comprise network node 110. Network node 110 may comprise any network node configured to incorporate the aging operations as described herein. Aging operations are typically implemented in those network nodes managing addresses for routing or forwarding functions, such as bridges, switches or routers. In one embodiment, network node 110 may comprise, for example, a bridge 10. The embodiments are not limited in this context.

In one embodiment, bridge 110 may connect LAN 108 and LAN 110, allowing the separate LANs to appear and operate as a single, seamless network. Bridge 110 may communicate packets between LAN 108 and LAN 118. Packets from nodes 102, 104 and 106 from LAN 108 may be received by bridge 110. Bridge 110 may recognize that the packets are intended for a node on LAN 118, and forward the packets to LAN 118 for delivery to the appropriate network node.

Figure 2:
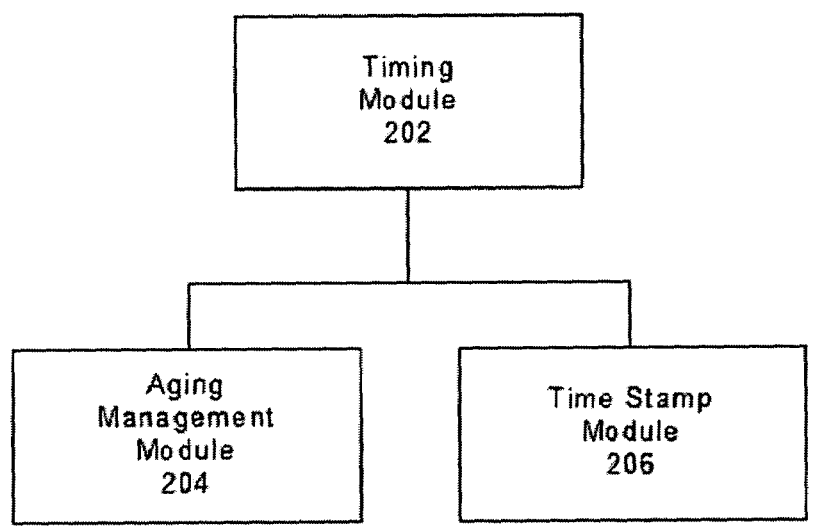
FIG. 2 illustrates a block diagram of an aging module in accordance with one embodiment.

FIG. 2 may illustrate an aging module in accordance with one embodiment. FIG. 2 may illustrate an aging module 200. Aging module 200 may comprise one or more modules. For example, in one embodiment aging module 200 may comprise a timing module 202, an aging management module 204 and a time stamp module 206. Although the embodiment has been described in terms of "modules" to facilitate description, one or more circuits, components, registers, processors, software subroutines, or any combination thereof could be substituted for one, several, or all of the modules.

The embodiments may be implemented using an architecture that may vary in accordance with any number of factors, such as desired computational rate, power levels, heat tolerances, processing cycle budget, input data rates, output data rates, memory resources, data bus speeds and other performance constraints. For example, one embodiment may be implemented as dedicated hardware, such as an Application Specific Integrated Circuit (ASIC), Programmable Logic Device (PLD) or Digital Signal Processor (DSP) and accompanying hardware structures. In another example, one embodiment may be implemented by software stored on a machine-readable medium and executed by a processor. In yet another example, one embodiment may be implemented by any combination of programmed general-purpose computer components and custom hardware components. The embodiments are not limited in this context.

In one embodiment, aging module 200 may perform aging functions for a network node, such as bridge 110. Aging is typically implemented in a Layer 2 (L2) switch or bridge. Bridge 110 performs automatic learning of the network nodes connected directly and indirectly to it upon reception of any frame for a given network node. When bridge 110 receives a packet from a network node, it retrieves the source address from the packet and stores it in a list, table or database ("address list"). For example, if network node 102 sends a packet to network node 112 via bridge 110, bridge 110 receives the packet and retrieves the network address for network node 102. The address list may be used to assist in forwarding packets to their intended destination. Aging module 200 may manage the address list to ensure that it contains only those addresses that have been used by bridge 110 within a certain period of time. Proper management of the address list may ensure that the forwarding function remains accurate and uses memory resources efficiently. For example, old addresses may cause bridge 110 to incorrectly forward packets to a network node that has been moved in the network. In another example, old addresses may take the place of newer addresses thereby lowering the performance of bridge 110 by causing unnecessary traffic flooding.

In one embodiment, time stamp module 206 may be used to associate or "stamp" a time stamp value with each address. Each address in the address list has a time stamp value associated with it. The term "time stamp value" as used herein may refer to the last time a packet with the address was received by bridge 110. For example, when a packet is received at bridge 110, the source address may be retrieved from the packet and compared to the address list. If the retrieved address is not part of the address list, then it is added to the address list along with a time stamp value indicating when bridge 110 received the packet. If the retrieved address is part of the address list, then the previous time stamp value associated with the address is updated or "re-stamped" with the current time stamp value when bridge 110 received the packet.

In one embodiment, aging management module 204 may manage the address list. Aging management module 204 may periodically scan the address list in order to detect and remove certain addresses from the address list based on their associated time stamp values. In one embodiment, aging management module 204 may remove those addresses having time stamp values that represent the oldest times on the list, for example. In another embodiment, aging management module 204 may remove those addresses having a time stamp value later than an aging time value. The term "aging time value" as used herein may refer to a time period that an address should remain on the list. The embodiments are not limited in this context.

To perform aging using an aging time value, an aging time value and time stamp value may be retrieved from memory. A distance between a current time value and time stamp value may be calculated. This distance may sometimes be referred to as a "circular distance." When the circular distance becomes greater than the aging time value, then the address associated with the time stamp value may be due for removal from the address list.

In one embodiment, LAN 108 and LAN 118 may comprise one or more Virtual Local Area Networks (VLAN). A VLAN may represent a logical subset of the network nodes connected to LAN 108 and LAN 118. For example, network nodes 102 and 104 may comprise a first VLAN, while network nodes 112 and 114 may comprise a second VLAN. The number of VLANs and nodes per VLAN are not limited in this context.

In one embodiment, aging management module 204 may perform aging operations for each VLAN in a different manner. For example, one VLAN may perform aging by removing the oldest addresses from the address list, while another VLAN may perform aging using an aging time value. Further, each VLAN may use a different aging time value to perform aging. The aging time value may vary according to each implementation. For example, if a VLAN utilizes a protocol such as the Rapid Reconfiguration Spanning Tree Protocol, the VLAN may be configured with a shorter aging time value thereby removing entries faster from the address list.

To implement a different aging time value for each VLAN may require a separate timer for each VLAN. Some bridges, however, may support thousands of VLANs thereby requiring thousands of independent timers. Unlike software solutions, hardware solutions to implement this number of timers may be relatively expensive. For example, if bridge 110 is configured to support 4096 VLANs, then aging module 200 may need approximately 4096 independent counters.

To solve this problem, aging module 204 may utilize timing module 202 to implement the timing functions to perform aging. Timing module 202 may utilize a single counter to implement a plurality of timers to perform aging operations for a plurality of VLANs. Timing module 204 may be described in more detail with reference to FIG. 3.

Figure 3:
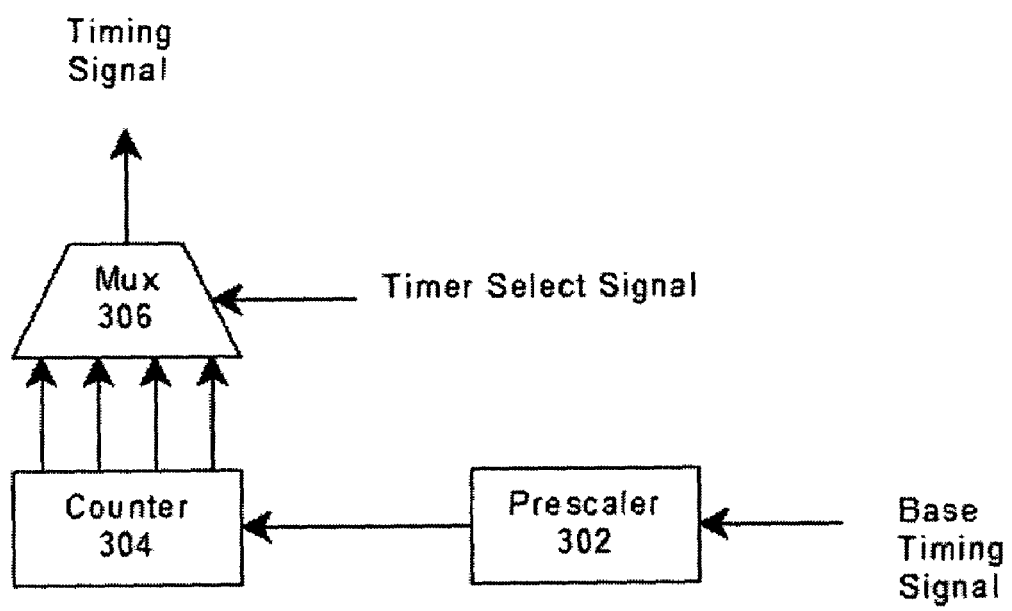
FIG. 3 illustrates a block diagram of a timing module in accordance with one embodiment.

FIG. 3 illustrates a block diagram of a timing module in accordance with one embodiment. FIG. 3 illustrates a timing module 300. Timing module 300 may be representative of, for example, timing module 202. In one embodiment, timing module 300 may comprise a prescaler 302, a counter 304, and a multiplexer (MUX) 306.

In one embodiment, prescaler 302 may receive a base timing signal from a clock. The clock may comprise a general clock used by bridge 110, or a separate clock implemented for aging module 200, for example. The clock may generate a base timing signal and send it to prescaler 302. Prescaler 302 may receive as input the base timing signal. Prescaler 302 may expand the units of time for the base timing signal to accommodate different timers for different VLANs. This may be accomplished using, for example, a scaling value. The term "scaling value" as used herein may refer to a value used to scale a unit of time to increase or decrease a time range. For example, a first VLAN may be configured to be incremented every 10 seconds, while a second VLAN may be configured to be incremented every 100 seconds. Assuming that the base timing signal comprises 1 second per unit, prescaler 302 may be used to expand the 1 second per unit by a factor of 10 and 100, respectively, for example. After prescaler 302 sets the units of time, it outputs a scaled timing signal. The scaled timing signal may be sent to counter 304.

In one embodiment, counter 304 may receive the scaled timing signal from prescaler 302. Counter 304 may comprise N number of bits. The N number of bits may vary according to a number of factors, such as the time range for counter 304 and the granularity of the units for the time range. For example, assume that counter 304 is configured with N=5 bits. If the counter changes every 1 second, then counter 304 may have a time range of 1 to 32 seconds. Prescaler 302 may be used to change the units of time for counter 304. For example, if prescaler 302 expands the 1 second of time to 10 seconds of time, the counter may change every 10 seconds, thereby allowing a time range of 10 to 320 seconds. The embodiments are not limited in this context.

In one embodiment, counter 304 may be used to implement a plurality of timers. Assume counter 304 is configured with N=20 bits. Counter 304 may be divided into P timers. For example, counter 304 may be divided into a number of age zones. The term "age zone" as used herein may refer to an individual timer implemented using a subset of bits comprising counter 304. Assume that counter 304 has an age zone (P), with P=4 timers, and each timer comprising 5 bits of N=20 bits. Assuming counter 304 increments every second, each timer will increment (I) as shown in Table 1.

TABLE 1

| Timer (P) | Increment (I) |
|---|---|
| Timer 0 | 1 second |
| Timer 1 | 32 seconds |
| Timer 2 | 256 seconds |
| Timer 3 | 8192 seconds |

As shown in Table 1, Timer 0 may increment every 1 second, Timer 1 every second, Timer 2 every 256 seconds and Timer 4 every 8000 seconds. Consequently, counter 304 with N=20, P=4 and I=1, may allow a time range from 1 second to 1 million seconds completely in hardware with a resolution of 1/32 or 3.12%. Of course the values for N, P and I are by way of example only, and may vary according to a given implementation.

The time range and resolution for each timer may vary according to N, P and I. In addition, the time range and resolution for each timer may vary according to the subset of bits used from counter 304.

In one embodiment, for example, the individual timers may comprise a subset of contiguous non-overlapping bits from counter 304. For example, assume the case where N=20 and P=4. Timers 0-3 may comprise the following bits: Timer 0 may comprise bits 0-4; Timer 1 may comprise bits 5-9; Timer 2 may comprise bits 10-14; and Timer 3 may comprise bits 15-19.

In one embodiment, for example, the individual timers may comprise a subset of contiguous overlapping bits from counter 304. Examples for this case may be shown in Table 2.

TABLE 2

| Dynamic Range (bits) | Dynamic Range (counts) | Granularity (bits) | Granularity error (%) |
|---|---|---|---|
| 20 | 1048576 | 0 | 100.0% |
| 16 | 65536 | 1 | 50.0% |
| 12 | 4096 | 2 | 25.0% |
| 8 | 256 | 3 | 12.5% |
| 4 | 16 | 4 | 6.3% |

As previously, if N=20 and P=4, and there are no overlapping bits, then the time range approximately 1 million seconds. As shown in Table 2, if N=16 and P=4, and there is 1 overlapping bit, then the time range may be approximately 65,536 seconds. Consequently, as the number of overlapping bits is increased, the time range is reduced. The granularity error, however, is also reduced. Accordingly, timing module 202 may be designed to accommodate various design constraints to fit a given implementation.

In one embodiment, counter 304 may receive the scaled timing signal from prescaler 302 and output a plurality of counter value signals. Each counter value signal may correspond to an age zone or timer 0-3 as shown in Table 1. All the counter value signals may be sent from counter 304 to MUX 306.

In one embodiment, MUX 306 may receive the plurality of counter value signals and a timer select signal. MUX 306 may also receive a timer select signal. The timer select signal selects which age zone or timer to use for a given application. Once the age zone or timer is selected, MUX 306 outputs a timing signal comprising one of the counter value signals selected using the timer select signal. For example, if the timer select signal selects the counter value signal representing Timer 3, then the timing signal may represent a time where I=8000 seconds.

In one embodiment, the timer select signal may be received from, for example, time stamp module 206. In this embodiment, time stamp module 206 may receive a first request from aging management module 204 for a time to associate with an address from a recently received packet. Time stamp module 206 may retrieve an age zone value associated with the address from an age zone table. Alternatively, the request may also include an age zone value for the address. Time stamp module 206 may send the appropriate timer select signal that corresponds to the age zone value for the address. Time stamp module 206 may receive the appropriate timing signal from timing module 202, and associate the time represented by the timing signal with the address.

In one embodiment, the time select signal may be received from, for example, aging management module 204. In this embodiment, aging management module 204 may retrieve the age zone value for an address from a recently received packet. Aging management module 204 may retrieve the age zone from the age zone table, for example. Aging management module 204 may send the appropriate timer select signal that corresponds to the retrieved age zone value for the address. Aging management module 204 may receive the appropriate timing signal from timing module 202, and associate the time represented by the timing signal with the address.

Figure 4:
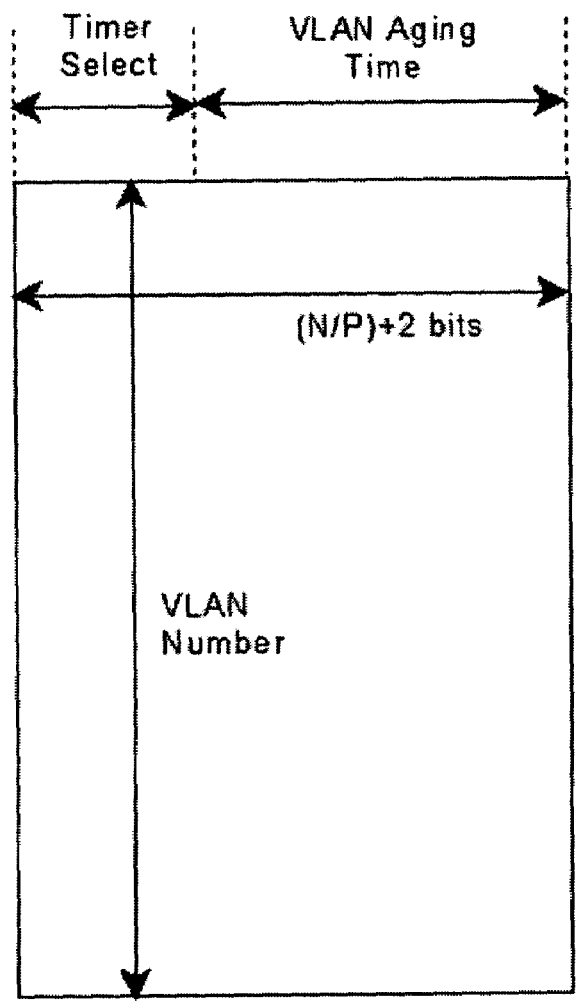
FIG. 4 illustrates an aging zone table in accordance with one embodiment.

FIG. 4 illustrates an age zone table in accordance with one embodiment. FIG. 4 illustrates an age zone table 400. Age zone table 400 may represent a data structure to store information associated with each VLAN. The information may be stored in memory, such as Read Only Memory (ROM) or Random-Access Memory (RAM). The memory requirements needed for a given age zone table may be represented as follows:

Number of VLANs×[Timer Selection bits+Aging Time Value bits]=Total Number of Memory Bits.

For example, if bridge 110 is configured to support 4096 VLANs, then age zone table 400 may comprise 4096 entries, with each entry comprising a number of bits sufficient to represent the number of timers used by aging module 200, and also a number of bits sufficient to identify an aging time value for each VLAN. An example of the latter may be represented by N/P. Using the previous example of N=20 and P=4, then the number of bits sufficient to represent the number of timers used by aging module 200 may be 2 bits, and the number of bits sufficient to represent an aging time value for each VLAN is 5 bits. Consequently, the size of the memory needed to store age zone table 400 may be 4096×7 bits or 28,000 memory bits.

In one embodiment, age zone table 400 may comprise 4096 entries, each comprising 7 bits. The first 2 bits may comprise the age zone value. The next 5 bits may comprise the aging time value, For each address received by bridge 110, aging module 200 may identify the VLAN associated with the address, and retrieve the age zone value associated with the VLAN to select the appropriate timer to use for time stamping or aging of the address.

In one embodiment, the age zone table may be used to retrieve the aging time value for a VLAN. Aging management module 204 may also provide a user interface to provide the capability to select which age zone should be used for each VLAN. The user interface may also provide the capability to select the aging time value for each VLAN in its respective timer units. For example, if Timer 2 is selected for a given VLAN, then each time unit is 256 seconds. Consequently, if a VLAN is programmed with an aging time value=3, then the aging time value would be approximately 3*256 seconds or 768 seconds.

Figure 5:
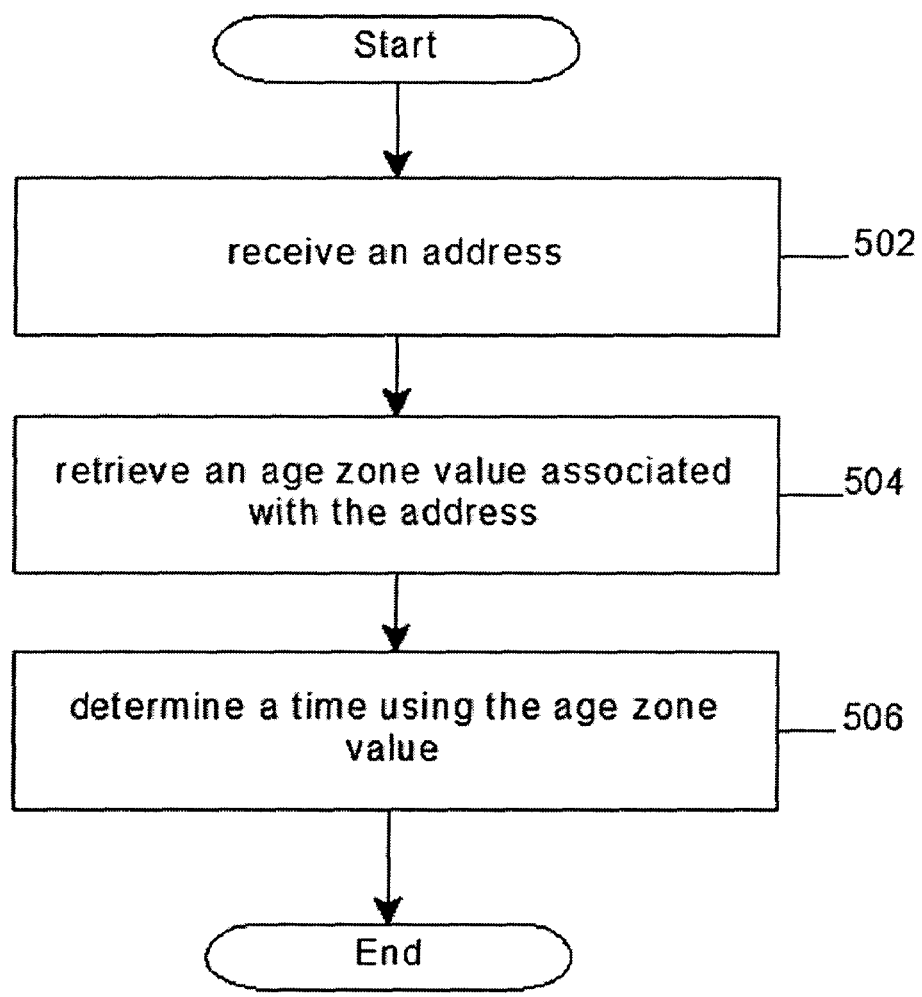
FIG. 5 illustrates a first block flow diagram of the programming logic performed by a timing module in accordance with one embodiment.
Figure 6:
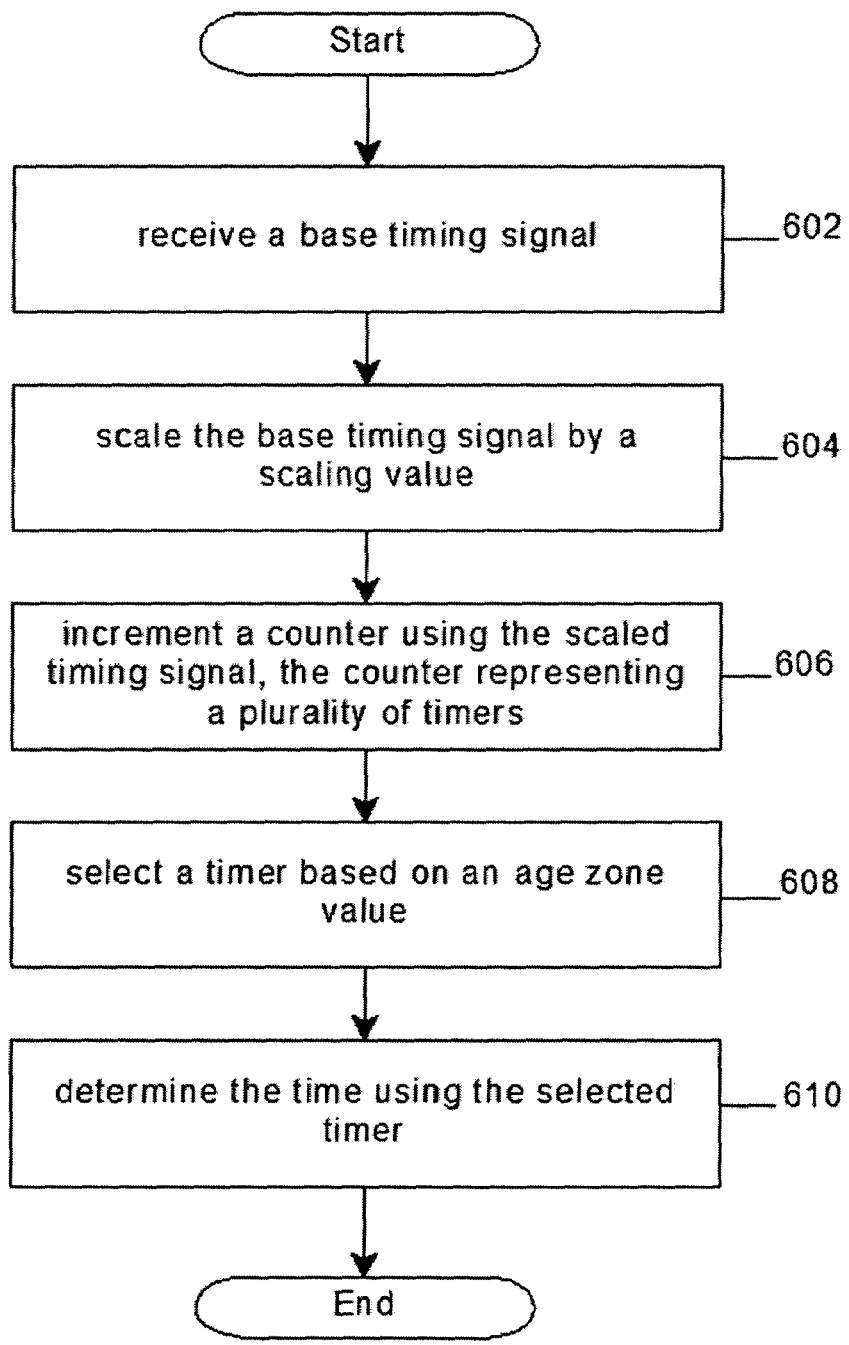
FIG. 6 illustrates a second block flow diagram of the programming logic performed by a timing module in accordance with one embodiment.

The operations of systems 100-300, and age zone table 400, may be further described with reference to FIGS. 5 and 6 and accompanying examples. Although FIGS. 5 and 6 presented herein may include a particular programming logic, it can be appreciated that the programming logic merely provides an example of how the general functionality described herein can be implemented. Further, the given programming logic does not necessarily have to be executed in the order presented unless otherwise indicated. In addition, although the given programming logic may be described herein as being implemented in the above-referenced modules, it can be appreciated that the programming logic may be implemented anywhere within the system and still fall within the scope of the embodiments.

FIG. 5 illustrates a programming logic 500 for a timing module in accordance with one embodiment. Programming logic 500 may illustrate a programming logic to perform timing. For example, an address may be received at block 502. An age zone value associated with the address may be retrieved at block 504. The age zone value may represent, for example, a subset of bits P from a set of bits N used for the timer. In one embodiment, the age zone value may correspond to a VLAN. A time may be determined using the age zone value at block 502.

In one embodiment, the time may be associated with the address, thereby becoming a time stamp value. To perform aging, a time stamp value associated with the address may be retrieved. The time stamp value may be compared to the time. The address may be removed from an address list based upon the comparison.

FIG. 6 illustrates a programming logic 600 for a timing module in accordance with one embodiment. Programming logic 600 may illustrate a programming logic to determine a time using an age zone value. A base timing signal may be received at block 602. The base timing signal may be scaled by a scaling value at block 604. A counter may be incremented using the scaled timing signal at block 606, with the counter representing a plurality of timers. The counter may have N number of bits, for example. A timer may be selected based on the age zone value at block 608. The timer may have an N/P number of bits, for example. The time may be determined using the selected timer at block 610.

The operation of systems 100-300, age zone table 400, and programming logic 500 and 600 as shown in FIGS. 5 and 6, respectively, may be better understood by way of the following example. The following example uses pseudo-code to demonstrate the aging operations for L2 records in accordance with one embodiment.

```
L2_zone_info[4];
L2_zone_info[0] = L2AIR.major0;
L2_zone_info[1] = L2AIR.major1;
L2_zone_info[2] = L2AIR.major2;
L2_zone_info[3] = L2AIR.major3;
Struct {
        timer,
        num_zones
} timer_zone_list[4096];
// This process is called if the record is not static and aging is enabled.
update_aging_time_stamp(record) {
        if (record.type == L2 ) {
                record.TIMESTAMP = L2_zone_info[timer_zone_list[record.VID].timer
        }
}
```

```
                else {
                        record.TIMESTAMP = L2_zone_info[timer_zone_list[record.VID].timer]
                }
        }
}
// hash function being used
L2_divider = 0;
L2_MINOR_ZONE = 0;
L3_divider = 0;
L3_MINOR_ZONE = 0;
on_system_clock( ) {
    L2_divider = L2_divider + 1;
    If (L2_divider == L2_TC) {
        L2_MINOR_ZONE = (L2_MINOR_ZONE +1) % 1024;
        L2_divider = 0;
    }
    if (L2_MINOR_ZONE == 0) {
    process_aging_zone_change( L2_zone_change ) ;
    }
    ...
}
process_aging_zone_change( change_zone_type) {
        switch (change_zone_type) {
                case L2_zone_change:
                        majorClockFactor = (32 >> overlapFactor);
                        if ( (L2AIR.major0.zone +1) > 31) {
                                L2AIR.major0.zone = 0;
                        }
                        else {
                                L2AIR.major0.zone += 1;
                        }
                        if (L2AIR.major0.zone % majorClockFactor == 0) {
                                if ( (L2AIR.major0.zone +1) > 31) {
                                        L2AIR.major1.zone = 0;
                                }
                                else {
                                        L2AIR.major1.zone += 1;
                                }
                                if (L2AIR.major1.zone % majorClockFactor == 0) {
                                        if ( (L2AIR.major2.zone +1) > 31) {
                                                L2AIR.major2.zone = 0;
                                        }
                                        else {
                                                L2AIR.major1.zone += 1;
                                        }
                                        if (L2AIR.major2.zone % majorClockFactor == 0) {
                                                if ( (L2AIR.major3.zone +1) > 31) {
                                                        L2AIR.major3.zone = 0;
                                                }
                                                else {
                                                        L2AIR.major3.zone += 1;
                                                }
                                        }
                                }
                        }
                        If (AGRCR.12_record_aging_enabled == SET) {
                                scan_12_records( );
                                update 12 record aging interrupt status;
                                if (AGRCR.12_interrupt enabled == SET) {
                                        raise aging interrupt signal;
                                }
                        }
                        break;
                    ... // other type of records not shown (L3, MPLS etc)
        }
}
scan_12_records( ) {
    L2_record = get first L2_record;
    while(L2_record) {
        timer_zone = time_zone_list[L2_record.VID];
        If ( L2_timers[time_zone.timer].current_zone >= (L2_record.TIMESTAMP +
            timer_zone.num_zones)%32) {
            Delete the L2 record;
            Put the L2 record in cpu fifo;
        }
```

-continued

```
        L2_record = get next L2_record;
    }
}
```

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to perform timing, comprising: retrieving a source address from a received packet by a network node; retrieving an age zone value associated with said address; and determining a time using said age zone value; wherein said determining comprises: receiving a base timing signal; scaling said base timing signal by a scaling value; incrementing a counter using said scaled timing signal, said counter representing a plurality of timers; selecting a timer based on said age zone value; and determining said time using said selected timer.

2. The method of claim 1, wherein said counter comprises N number of bits, and each timer comprises a subset P number of bits of said N number of bits.

3. The method of claim 2, wherein each subset P number of bits comprises a contiguous non-overlapping subset of said N number of bits.

4. The method of claim 2, wherein each subset P number of bits comprises a contiguous overlapping subset of said N number of bits.

5. The method of claim 4, wherein as a number of overlapping bits increases a time range associated with each timer decreases, and a granularity error associated with each timer increases.

6. An apparatus, comprising:
a clock to generate a base timing signal;
a prescaler to receive as input said base timing signal and output a scaled timing signal;
a counter, divided into a plurality of age zones, to receive said scaled timing signal and output a plurality of counter value signals, wherein a counter value signal corresponds to an age zone; and
a multiplexer to receive said plurality of counter value signals and a timer select signal, and output a timing signal comprising one of said counter value signals selected according to an age zone selected by said timer select signal.

7. The apparatus of claim 6, further comprising a time stamp circuit to output said timer select signal.

8. The apparatus of claim 6, further comprising an aging management circuit to output said timer select signal.

9. An article comprising: a storage medium; said storage medium including stored instructions that, when executed by a processor, result in performing timing by retrieving a source address of a received packet, retrieving an age zone value associated with said address, and determining a time using said age zone value by receiving a base timing signal, scaling said base timing signal by a scaling value, incrementing a counter using said scaled timing signal, said counter representing a plurality of timers, selecting a timer based on said age zone value, and determining said time using said selected timer, said age zone value representing a subset of bits from a set of bits N used for a timer.

10. The article of claim 9, wherein the stored instructions, when executed by a processor, further result in retrieving a time stamp value associated with said address, comparing said time stamp value with said time, and removing said address from a database based upon said comparison.

* * * * *